(12) United States Patent
Teyeb et al.

(10) Patent No.: US 10,075,987 B2
(45) Date of Patent: Sep. 11, 2018

(54) MULTIPATH TCP SUBFLOW ESTABLISHING ON SINGLE IP CONNECTION

(71) Applicant: Telefonaktiebolaget LM Ericsson (Publ), Stockholm (SE)

(72) Inventors: Oumer Teyeb, Solna (SE); Gunnar Mildh, Sollentuna (SE); Jari Vikberg, Järna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 104 days.

(21) Appl. No.: 15/100,872

(22) PCT Filed: Dec. 18, 2013

(86) PCT No.: PCT/SE2013/051554
§ 371 (c)(1),
(2) Date: Jun. 1, 2016

(87) PCT Pub. No.: WO2015/094043
PCT Pub. Date: Jun. 25, 2015

(65) Prior Publication Data
US 2016/0309534 A1    Oct. 20, 2016

(51) Int. Cl.
*H04W 4/00* (2018.01)
*H04L 12/26* (2006.01)
(Continued)

(52) U.S. Cl.
CPC ......... *H04W 76/025* (2013.01); *H04L 5/0055* (2013.01); *H04L 61/2007* (2013.01);
(Continued)

(58) Field of Classification Search
CPC . H04W 76/025; H04W 76/022; H04W 88/02; H04W 76/026; H04W 80/06;
(Continued)

(56) References Cited

U.S. PATENT DOCUMENTS

2008/0089228 A1* 4/2008 Lin ................... H04L 47/10
                                                           370/230
2011/0235578 A1* 9/2011 Laganier ............ H04W 60/005
                                                           370/328
(Continued)

FOREIGN PATENT DOCUMENTS

| EP | 2 538 637 A2 | 12/2012 |
| WO | 2011041798 A1 | 4/2011 |
| WO | 2012099762 A1 | 7/2012 |

OTHER PUBLICATIONS

3GPP TS 23.261 V11.0.0 (Sep. 2012) 3rd Generation Partnership Project; Technical Specification Group Services and System Aspects; IP Flow Mobility and Seamless Wireless Local Area Network (WLAN) Offload; Stage 2 (Release 11) Sep. 18, 2012 consisting of 22-pages.

(Continued)

*Primary Examiner* — Kiet Tang
(74) *Attorney, Agent, or Firm* — Christopher & Weisberg, P.A.

(57) ABSTRACT

The present disclosure relates to a method, performed in a single IP-address source node in a wireless communication network, of establishing a multipath TCP, MPTCP, connection for transfer of TCP data in MPTCP subflows to a destination node. The single IP-address source node receives an MPTCP trigger to activate a multipath TCP connection. One or more source TCP ports are selected, wherein each source TCP port is selected to constitute a starting point of an MPTCP subflow. One or more MPTCP notifications are sent to the destination node. Each MPTCP notification includes information on a selected source TCP port. The single IP-address source node receives an acknowledgment of each MPTCP notification from the destination node.

(Continued)

The present disclosure also relates to corresponding method performed in a destination node and a wireless device configured for establishing an MPTCP connection.

20 Claims, 5 Drawing Sheets

(51) Int. Cl.
| | |
|---|---|
| *H04W 76/02* | (2009.01) |
| *H04L 29/06* | (2006.01) |
| *H04L 5/00* | (2006.01) |
| *H04L 29/12* | (2006.01) |
| *H04W 76/15* | (2018.01) |
| *H04W 80/06* | (2009.01) |
| *H04W 88/02* | (2009.01) |
| *H04W 76/16* | (2018.01) |
| *H04W 76/12* | (2018.01) |

(52) U.S. Cl.
CPC .............. *H04L 69/14* (2013.01); *H04L 69/16* (2013.01); *H04L 69/163* (2013.01); *H04W 76/15* (2018.02); *H04L 61/6022* (2013.01); *H04L 61/6063* (2013.01); *H04W 76/12* (2018.02); *H04W 76/16* (2018.02); *H04W 80/06* (2013.01); *H04W 88/02* (2013.01)

(58) Field of Classification Search
CPC ... H04L 5/0055; H04L 61/2007; H04L 69/16; H04L 69/14; H04L 69/163; H04L 61/6063; H04L 61/6022
See application file for complete search history.

(56) References Cited

U.S. PATENT DOCUMENTS

| | | | |
|---|---|---|---|
| 2012/0188949 A1* | 7/2012 | Salkintzis | H04L 45/308 370/329 |
| 2013/0195004 A1 | 8/2013 | Hampel | |
| 2013/0311614 A1 | 11/2013 | Salkintzis | |
| 2014/0362765 A1* | 12/2014 | Biswas | H04W 76/026 370/328 |

OTHER PUBLICATIONS

A. Ford, et al.—Title: "TCP Extensions for Multipath Operation with Multiple Addresses," Internet Engineering Task Force (IETF), Request for Comments: 6824, Category: Experimental, ISSN: 2070-1721 Jan. 2013 consisting of 128-pages.

A. Gonzales, et al.—Title: "Radio Access Considerations for Data Offloading with Multipath TCP in Cellular/WiFi Networks," 2013—IEEE Conference on Information Networking (ICOIN), INSPEC Accession No. 13431548, DOI: 10.1109/ICOIN.2013. 6496709, XP32357071A, Jan. 28-30, 2013 consisting of 6-pages.

Supplemental European Search Report dated Sep. 22, 2016 for European Regional Phase Application Serial No. 13 899 349.8-1853, European Regional Phase Entry Date: May 18, 2016 consisting of 6-pages.

International Search Report and Written Opinion dated Aug. 20, 2014 for International Application Serial No. PCT/SE2013/051554, International Filing Date—Dec. 18, 2013 consisting of 9-pages.

* cited by examiner

MULTIPATH TCP SUBFLOW ESTABLISHING ON SINGLE IP CONNECTION

TECHNICAL FIELD

The disclosure relates to multipath TCP, MPTCP over a single IP connection. More specifically, the disclosure relates to methods for setting up MPTCP over a single Internet Protocol, IP, connection and network nodes contributing to setting up MPTCP over a single IP connection.

BACKGROUND

Transmission Control Protocol, TCP, is the most dominant protocol used in computer networking and on the Internet. TCP is a connection-oriented protocol, where devices at the end points, nodes, establish a connection before any data is sent.

In a connection establishment phase, or call set up phase, control data is passed between the nodes to establish a connection. The TCP protocol uses a three way handshake protocol to synchronize and to establish a TCP connection between two nodes. The TCP connection is initiated by a source node sending a synchronization, SYN, packet toward a destination node. The destination node acknowledges receipt of the SYN packet with a SYN-ACK packet sent toward the source node. Upon receipt of the SYN-ACK packet from the destination node, the source node responds with an acknowledgement, ACK, packet thereby concluding the establishment phase. During this 3-way handshake the hosts negotiate the connection settings.

Once the connection is set up, the speed of the data transmission is controlled by three factors: the rate at which the source is willing to send data, controlled by the congestion control algorithm; the TCP window space advertised by the destination; and the rate at which data appears to be getting delivered to the destination as determined by the ACK packets received at the source from the destination.

Multipath TCP, MPTCP, allows a data connection or session to use multiple paths to maximize resource usage and increase redundancy. The redundancy offered by MPTCP enables increased TCP throughput. MPTCP has one main TCP flow and multiple TCP subflows and is capable of distributing load on all interfaces. As the multiplexing of different connections is on TCP level it allows separate congestion control for each subflow.

MPTCP is particularly useful in the context of a heterogeneous wireless network using both Wi-Fi and a mobile network as a typical use case. In addition to the gains in throughput, subflows may be added or dropped as the user moves in or out of coverage without disrupting the end-to-end MPTCP connection. The subflows can also be pre-established while the user is in the coverage of multiple accesses, and the usage of the different subflows can be activated while the user moves between different accesses. MPTCP is currently under standardization process within IETF (https://datatracker.ietf.org/wg/mptcp/).

Some benefits of MPTCP include:
- It allows a single data-connection to use several interfaces simultaneously increasing the throughput.
- It allows failover from one interface to another (e.g. in the case of mobile client moving between 3GPP and Wi-Fi)
- It increases the bandwidth due to resource pooling.
- It is backwards compatible i.e. it falls back to TCP as needed (e.g. in the case when the other side doesn't support MPTCP).
- It is transparent to the applications. i.e., the applications benefit from MPTCP without any code changes as they use a standard socket API The main scenario that MPTCP is designed for, is the case when at least one of the communicating parties are associated with multiple interfaces and IP addresses making it possible to route the data through different paths in the network using these different IP addresses.

The MPTCP specification also supports MPTCP on a shared IP stack, connection and address using the same IP address at both ends. However, whilst providing support for aggregation of multiple network paths in a single IP case in the MPTCP specification, mechanisms for enabling such aggregation is lacking in the specification.

SUMMARY

It is an object of the disclosure to provide mechanisms for supporting single IP aggregation of multiple network paths. It is a further object of the disclosure to enable identification and separation of MPTCP data related to different subflows using a single IP address on the different network paths in order to support aggregation of multiple network paths with MPTCP.

An embodiment of the present disclosure relates to a method, performed in a single IP-address source node in a wireless communication network, of establishing a multipath TCP, MPTCP, connection for transfer of TCP data in MPTCP subflows to a destination node. The single IP-address source node receives an MPTCP trigger to activate a multipath TCP connection. One or more source TCP ports are selected, wherein each source TCP port is selected to constitute a starting point of an MPTCP subflow. One or more MPTCP notifications are sent to the destination node. Each MPTCP notification includes information on a selected source TCP port. The single IP-address source node receives an acknowledgment of each MPTCP notification from the destination node.

Future multiple radio access network connections are anticipated to share the same IP stack, connection and address. The introduction of a triggering mechanism for establishment of a multipath TCP connection enables establishment of the connection only in the cases when there are benefits to gain from establishing such a connection. However, in the many cases where the multipath TCP connection on a single Internet Protocol, IP, address does not provide clear benefit, the multipath connection will not be initiated. Thus, the disclosure provides the advantage of initiating a single IP-address multipath connection, only when such an MPTCP provides gain or is useful.

Notification of the additional TCP ports used for the multipath TCP connection, enables the destination to implicitly determine new ports being used for a further subflow by comparing five tuples of the further subflow to the first subflow. The notification procedure also provides for a procedure of adding subflows with the same IP address that is similar to the existing procedure of adding subflows with different IP-addresses and is consequently advantageous for implementation.

In accordance with an aspect of the disclosure, the single IP-address source node associates each MPTCP subflow to a respective wireless link.

The association of a MTPCP subflow provides a possibility to fully and maximally utilize the different TCP subflows. Total throughput is increased by aggregating TCP subflows from different radio access networks. The association of the MPTCP subflow to a respective wireless and communication of this association from the single IP-address source node to the destination node enables identification and separation of the multiple TCP subflows both on the side of the single IP-address source node and the destination node. In the wireless network context, the source and destination node represent a user equipment, UE, and the network side.

In accordance with an aspect of the disclosure, the activation of the multipath TCP connection comprises initiating one or more further subflows for an established TCP connection.

Activation of the multipath TCP connection by adding one or more additional subflows when a first connection has been established provides for a procedure similar to the existing procedure for adding subflows with different addresses. Building on existing agreed principles, provides for an easy implementation. Additional subflows may be added at any time after the first TCP connection has been established.

The method according to any of the preceding claims, wherein the MPTCP trigger is received in a three way TCP handshake establishing a connection between the single IP-address source node and the destination node.

Receipt of the MPTCP trigger in the phase of establishing a TCP connection, enables fast set up of a multipath TCP connection.

In accordance with another aspect of the disclosure, further comprising communicating Information on each association by means of a respective Traffic Flow Template, TFT.

Traffic Flow Templates, TFT, provide an advantageous solution to the problem of sharing the association or mapping between a single IP-address source node and a network node. The TFT is appended with additional information to indicate the radio access to use.

In accordance with an aspect of the disclosure, the MPTCP trigger is received in a message on a radio access protocol layer from a network entity. More specifically, according to an aspect of the disclosure, the MPTCP trigger is received in an Radio Resource Control, RRC, Packet Data Convergence Protocol, PDCP, Radio Link Control, RLC, or Medium Access Control, MAC, protocol layer message.

The MPTCP trigger can be provided from the network node on any protocol level below TCP/IP, for example using Non-Access Stratum, NAS, RRC or MAC protocol signaling. The protocol level can be control plane protocols and/or user plane protocols and the main benefit is that these protocol layers know about the information needed to create the MPTCP trigger. One example is mobility related actions known to these protocol layers.

In accordance with an aspect of the disclosure, the single IP-address source node provides an indication of the received MPTCP trigger to an MPTCP entity in the single IP-address source node configured to add and/or remove MPTCP subflows.

The internal processing of signals forwarded to an MPTCP entity in the single IP-address source node provides for an increased ability of handling signaling on a protocol level below the IP-layer.

In accordance with an aspect of the disclosure, a MPTCP subflow is established over a 3$^{rd}$ Generation Partnership Project, 3GPP, Radio Access Technology, RAT, wireless link.

In accordance with an aspect of the disclosure, a MPTCP subflow is established over a LTE or WCDMA/HSPA wireless link.

In accordance with an aspect of the disclosure, a MPTCP subflow is established over a Wireless Local Area Network, WLAN, wireless link.

Multipath TCP connections over different radio accesses enable simultaneous use of several interfaces for a single data-connection thereby increasing the throughput. It also enables failover from one interface to another, e.g. in the case of a client moving in an area with coverage holes.

In accordance with a further aspect of the disclosure, the destination node is an MPTCP proxy.

When a destination node of the TCP connection does not support multipath TCP, an MPTCP proxy can be introduced so that the benefits of MPTCP can be gained despite the limitations of the destination node. The MPTCP proxy communicates using normal TCP towards the destination node.

A further embodiment of the present disclosure relates to a method, performed in a destination node of a wireless communication system, of establishing a multipath TCP, MPTCP, connection for receipt of TCP data in MPTCP subflows from a single IP-address source node. One or more multipath TCP, MPTCP, notifications are received from a single IP-address source node, wherein each notification includes information on a selected source TCP port. The destination node sends an acknowledgement of each received MPTCP notification to the single IP-address source node, the acknowledgment including information on a selected destination port. The destination node further receives information on the association between a source TCP port and a respective wireless link and stores the association. The one or more stored associations are retrieved to identify and separate each multipath TCP, MPTCP, subflow of the MPTCP connection.

Another embodiment of the present disclosure relates to a wireless device configured for establishing a multipath TCP, MPTCP, connection for transfer of TCP data in MPTCP subflows to a destination node. A communication interface of the wireless device is configured to receive an MPTCP trigger to activate a multipath TCP connection and to send one or more MPTCP notifications to the destination node. A processor of the wireless device includes a multipath TCP, MPTCP, port selector configured to select one or more source TCP ports; each source TCP port selected to constitute a starting point of an MPTCP subflow; and a MPTCP notifier configured to include information on a selected source TCP port in a respective MPTCP notification.

With the above description in mind, the object of the present disclosure is to overcome at least some of the disadvantages of known technology as described above and below.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which:

FIG. 2
  a. is an illustration of MPTCP end-to-end connection
  b. is an illustration of MPTCP connection by means of a MPTCP proxy

FIG. 5 a. is signaling diagram illustrating an exchange of signals for an MPTCP connection establishment in an embodiment of a network b. is signaling diagram illustrating an exchange of signals for an MPTCP connection establishment in an embodiment of a network

DETAILED DESCRIPTION

Aspects of the present disclosure will be described more fully hereinafter with reference to the accompanying drawings. The methods and wireless device disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure to any particular embodiment. As used herein, the singular forms "a", "an" and "the" are intended to include the plural forms as well, unless the context clearly indicates otherwise.

The various steps described below in connection with the figures should be primarily understood in a logical sense, while each step may involve the communication of one or more specific messages depending on the implementation and protocols used.

It is an object of the disclosure to provide mechanisms for supporting single IP aggregation of multiple network paths and to enable splitting of MPTCP data on multiple paths to support aggregation of multiple network paths with MPTCP. A basic concept involves aggregation of multiple network paths with MPTCP in a single IP case. Examples of single IP cases are multiple connectivity within one 3GPP radio access technology, RAT, or between two or more 3GPP RATs or traffic aggregation between 3GPP RAT and Wi-Fi using the same IP stack, connection and address. Other cases could also include scenarios where only one access network is used, but the traffic is split into different routing paths in the transport network or over the Internet.

The disclosure provides new methods to establish additional MPTCP connections, also known as subflows, and to enable the identification and separation of the multiple TCP subflows on the side of a single IP-address source node of the MPTCP connection as well as a destination node of the connection.

Figure 1:
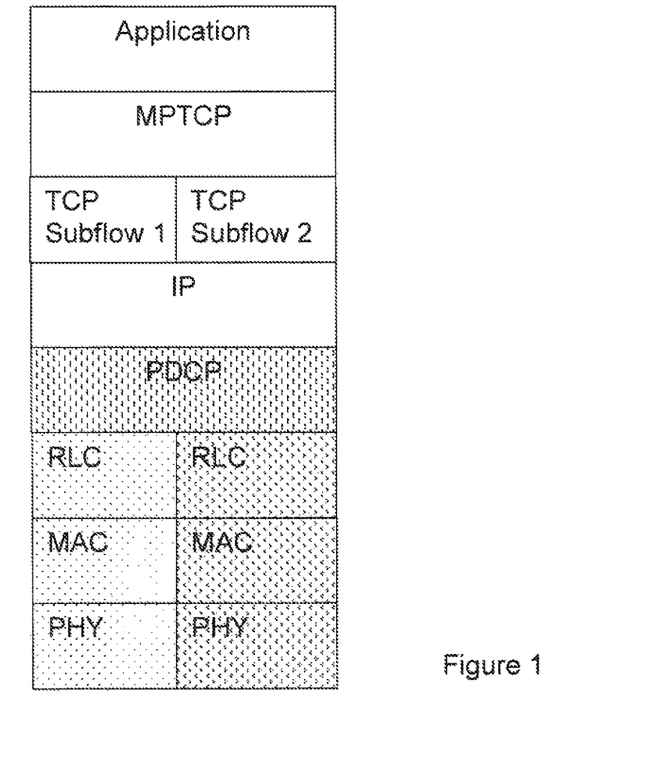
FIG. 1 illustrates an example of a MPTCP Protocol Stack

FIG. 1 discloses an example for a case of dual connectivity between LTE and WCDMA/HSPA. More specifically, FIG. 1 discloses the user plane protocol architecture. The main principle is that the IP connection, stack and address are shared and the traffic aggregation and separation is performed below the IP-layer. In the example of FIG. 1, this takes place on the PDCP-layer, which is a common layer for LTE and WCDMA/HSPA. The LTE protocol layer is illustrated on the left-hand side in FIG. 1, and the WCDMA/HSPA protocol layer is separated from the LTE protocol layer below the PDCP-layer and is illustrated on the right-hand side in FIG. 1. FIG. 1 also shows the application layer and the MPTCP layer and the use of 2 different TCP subflows, subflow 1 and 2.

Figure 2A:
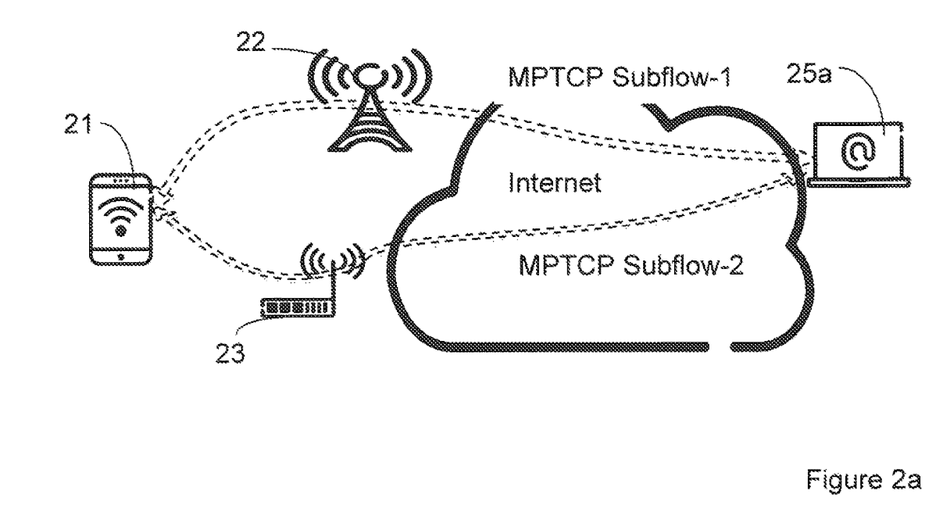

FIG. 2a-2b disclose options for deployment of MPTCP, e.g. for the multi-IP address case. FIG. 2a discloses the situation where both the source and the destination node of an IP-connection support MPTCP. The source node is here represented by an MPTCP enabled wireless device 21, e.g a user equipment, UE, and the destination node is represented by an MPTCP enabled Internet server 25a. In the illustrated case, MPTCP connections are established between the MPTCP enabled wireless device 21 and the MPTCP enabled Internet server 25a. The illustrated TCP connection from the MTPCP enabled wireless device 21 to the MTPCP enabled Internet server 25a includes a first subflow, MPTCP Subflow-1 and a second subflow, MPTCP Subflow-2. MPTCP Subflow-1 is set up over a 3GPP access network, here illustrated as an eNodeB 22. MPTCP Subflow-2 is set up over a Wi-Fi network, here illustrated by a router 23 (e.g. a Wi-Fi access point). The multipath connection is used all the way between MPTCP enabled wireless device 21 and the MPTCP enabled Internet server 25a.

Figure 2B:
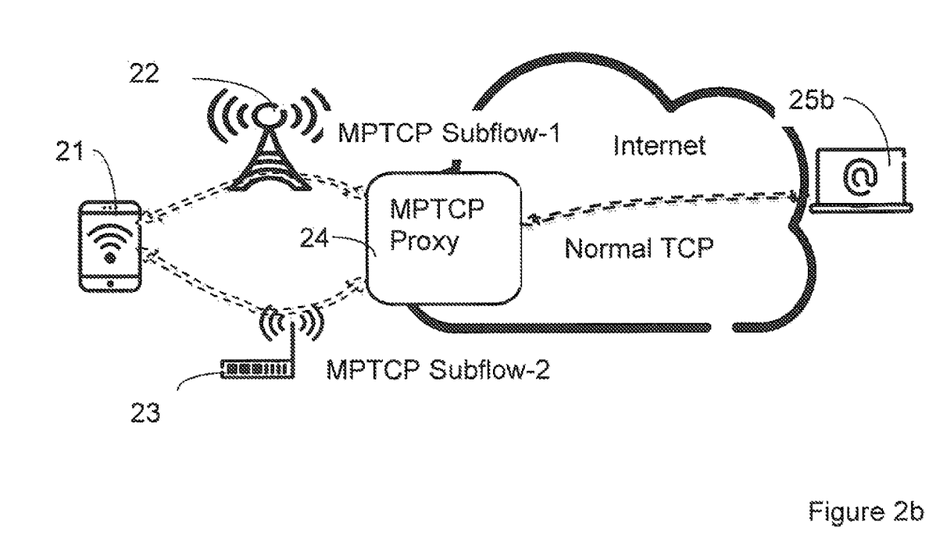

FIG. 2b discloses the situation when there is no support for MPTCP in an Internet server 25b, here representing a destination node. The source node remains an MPTCP enabled wireless device 21 and thus, still provides support for MPTCP. In this case an MPTCP proxy 24 is introduced in the network and represents a destination node of an MPTCP connection with the source node (with MPTCP subflows 1 and 2 toward the wireless device 21). The MPTCP proxy 24 is configured as a separate entity in the wireless communications network, part of a PDN-GW in the wireless network or any other suitable entity in the network. The MPTCP proxy 24 communicates toward the Internet server 25b node using a normal TCP connection.

With the use of MPTCP as disclosed in FIGS. 2a-b, it is possible to increase the total throughput of TCP traffic using a plurality of TCP subflows. However, in order to gain the benefits from such a set-up with TCP subflows, there must be an awareness in an MPTCP layer that multiple subflows are available and knowledge on how to aggregate data on such multiple subflows.

Figure 3:
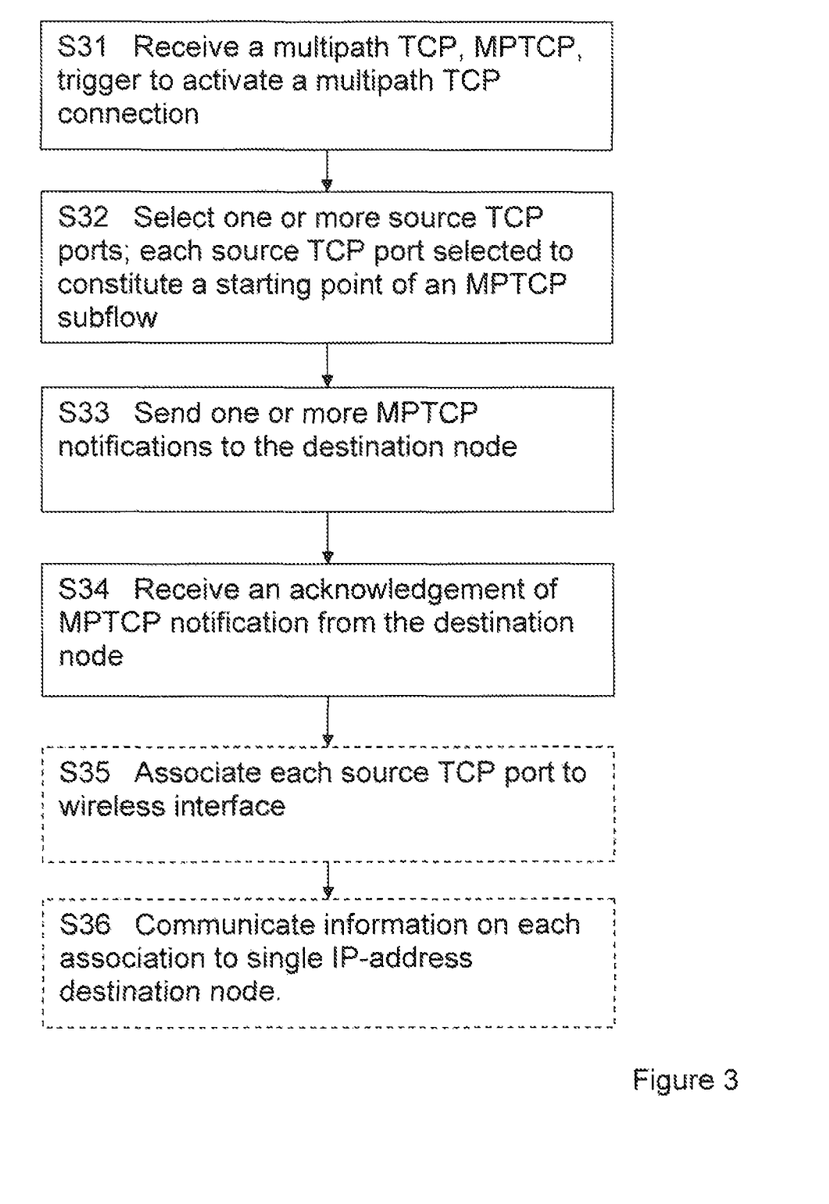
FIG. 3 is a flowchart illustrating embodiments of method steps performed in a single IP-address source node

FIG. 3 is a flowchart illustrating embodiments of method steps performed in a single IP-address source node in a wireless communication network to establish a multipath TCP connection including a plurality of MPTCP subflows to a destination node.

In the disclosed embodiment, receipt in step S31 of an MPTCP trigger to activate multipath TCP provides a starting point for establishing a multipath TCP connection. The use of an MPTCP trigger to activate additional MPTCP subflows in the single IP-case provides the benefit that subflows are primarily activated when there are gains, e.g. in throughput, from having such additional subflows and a multipath TCP connection. Without receipt of the MPTCP trigger, the TCP connection is maintained as a one flow TCP connection.

The multipath TCP establishment is initiated in the single IP-address source node, e.g. an MPTCP enabled wireless device such as a user equipment or mobile terminal, here also referred to as a mobile station. User equipment may further be referred to as mobile telephones, cellular telephones, or laptops with wireless capability, just to mention some further examples. The single IP-address source node in the present context may also be, for example, portable, pocket storable, hand-held, computer-comprised, or vehicle-mounted mobile devices. The single IP-address source node is enabled to communicate TCP data, via a RAN or other wireless access network, with a destination node, such as a MPTCP enabled server or an intermediate MPTCP enabled proxy, as illustrated in FIGS. 2a-2c.

A trigger to activate multipath TCP is received in the single IP-address source node from the network to which the single IP-address source node connects. By means of the MPTCP trigger, the network provides an indication to the single IP-address source node when to activate multiple flows. The MPTCP trigger provided from the network can be on any level below the IP-layer, for example using NAS, RRC or MAC protocol signaling. For an embodiment where the single IP-address source node is a wireless device or user equipment, UE, including an MPTCP entity, an MPTCP trigger received from a destination node in a wireless network is forwarded internally in the wireless device to the MPTCP entity.

According to an option, the MPTCP trigger could also include an indication to the MPTCP entity that subflows should be removed.

Alternatively, the MPTCP trigger to setup or possibly remove subflows over one IP-connection could also be signaled in MPTCP signaling, e.g, as part of a protocol extension to the MPTCP protocol. This is mostly feasible in the case when an MPTCP proxy located in the mobile network is used or when an MPTCP proxy is capable of receiving MPTCP triggers that multiple access links or network paths are available for a given wireless device.

Following receipt of the MPTCP trigger in step S31, the single IP-address source node proceeds to a step of selecting S32 one or more source TCP ports to use for an additional MPTCP subflow thus proceeding in the activation of a multipath TCP connection.

A TCP flow is uniquely identified by a so called five-tuple (protocol, source IP address, destination IP address, source port and destination port).

In TCP/IP, port numbers are divided into three ranges (RFC 4340):

1. Well Known Ports: ports 0 to 1023
2. Registered Ports: ports 1024 to 49151
3. Dynamic/Private Ports: ports from 49152 to 65535

On many systems, the well known ports (ports 0 to 1023) can only be used by system or root processes or by programs executed by privileged users. The registered ports (ports 1024-49151) are used for ordinary user processes or programs executed by ordinary users. Ports 49152 to 65535 (Dynamic/Private Ports) are intended for temporary use such as client-side ports.

The selecting S32 of one or more source TCP ports in the single IP-address source node refers to a selecting of one or more dynamic/private ports. Several options are possible when selecting the actual port number.

In one option for selecting the one or more source TCP ports, no specific mapping is employed for assigning port numbers and the single IP-address source node is free to choose whatever port number available to serve as a starting point for an additional MPTCP subflow.

In another option, the network can provide a range of port numbers that may be selected as a starting point for one or more additional MPTCP subflows. Information on the range of port numbers is included in lower layer communication to the MPTCP layer. The information on the range of ports is included in the multipath TCP trigger or in other signaling received in the single IP-address source node as part of establishing a TCP connection.

In yet another option a fixed mapping rule is applied so that a first when a first TCP connection is established for a given IP address, the source port will select port p1_start as a starting for the first path or flow of the connection. A corresponding destination port p1_end could represent an ending point for the TCP connection. When a multipath TCP connection is to be established, the single IP-address source node selects a second predefined port p2_start as a starting point for the second path to a respective ending point p2_end. When only one path is available, the MPTCP will use port numbers p1_start to p1_end. When a new path is established with the same IP address, the MPTCP will create the new subflow on this path using ports p2_start to p2_end.

Following selecting S32 of one or more source TCP ports, each port selected to constitute a starting point of an MPTCP subflow, the destination node is notified on the port selection in a MPTCP notification. The single IP-address source node sends S33 the MPTCP notification to the destination node, wherein the MPTCP notification includes at least each source TCP port selected as a starting point for a new subflow.

Figure 5A:
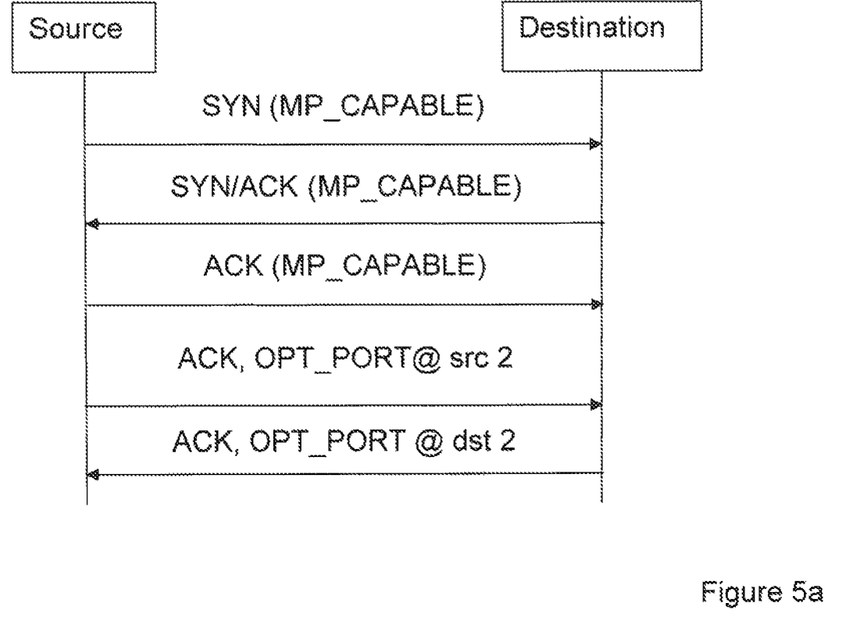

FIG. 5a discloses signaling of an MPTCP establishment process including an MPTCP notification according to one option. The TCP connection establishment involves a three-way handshake. In the disclosed option for the MPTCP establishment process, the single IP-address source node receives the MPTCP trigger in the three way handshake that is used to establish a first connection between the single IP-address source node and a destination node. The connection establishment starts with the sending of a SYN (synchronization) message toward the destination node. When establishing an MPTCP connection, the first SYN message includes information on an MP_CAPABLE option which informs the destination that the single IP-address source node supports MPTCP. The destination node responds with an acknowledgement of the synchronization message in a SYN/ACK message. If the destination node also supports MPTCP, the response includes information on an MP_CAPABLE option. The connection is finalized when the destination node receives an acknowledgement from the single IP-address source node in an ACK. In this ACK, the source could also include the MP_CAPABLE option. The TCP connection established between the source and the destination node represents a first subflow of a MPTCP connection. When adding additional subflows, an MPTCP connection is established.

Once it has been decided that MPTCP is to be used, i.e., that additional subflows should be added to the established connection, the source can communicate to the destination the additional port(s) to be used for the additional subflow(s). As previously described with reference to FIG. 3, the single IP-address source node selects one or more source TCP port to be used as a starting point of an MPTCP subflow. The selected source TCP ports are included in an MPTCP notification sent S33 to the destination node; the MPTCP notification including information on the new option, here denominated "OPT_PORT". The destination node implicitly determine the new ports being used for the additional subflow(s) by comparing the five tuples of the additional subflow(s) to that of the original subflow and determining that only one element of the five tuple is different from that of the first subflow. The destination node also implicitly determine that the new port represent an additional subflow for the established TCP connection. Upon determining that the received five tuple represent an additional subflow, the destination node acknowledges receipt "ACK, OPT_ PORT@dst2" of the MPTCP notification and the single IP-address source node receives the acknowledgement, as will be further detailed with reference to FIG. 5b. As an example, if the first subflow of the MPTCP connection belongs to an FTP session having destination port address 21, the server upon detecting a new packet with all five tuples having the same value as the first sub flow except for the source port address will be able to distinguish this from a new FTP session, since the start up of a new FTP session would include a TCP connection setup with the new source port number. The additional packet with the new source port number only incurs the subflow initiation, as further detailed below for FIG. 5b.

Figure 5B:
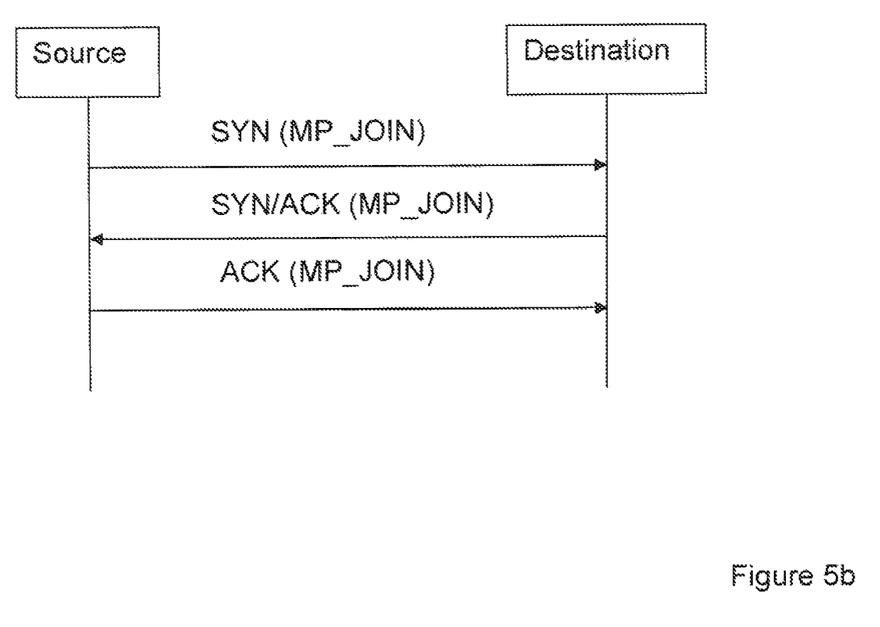

As illustrated in FIG. 5b, introduction of additional subflows involves a subflow initiation taking into account the port address difference and the keeping of the IP address. The source and destination IP addresses are kept, but the source port number field of the SYN and ACK messages from the source to the destination now contain the new port. Similarly, the destination port number field of the SYN and ACK messages from the destination to source contain the destination port number. The destination could be represented by one port, but it is also possible to use a plurality of ports each corresponding to a specific source port. As illustrated in FIG. 5b, the subflow initiation involves an establishment phase with a three way handshake, but where the SYN and ACK messages include an MP_JOIN option.

Consequently, the single IP-address source node, e.g. a wireless device or user equipment, communicates to the destination node the one or more selected ports to be used as starting points for an additional path by sending S33 one or more MPTCP notifications to the destination node, wherein each notification includes information on a selected source TCP port. The destination node is then able to implicitly determine the new ports being used for existing sub flows by comparing 5-tuples (protocol, source address, destination address, source port, destination port).

A multipath TCP subflow is established when the single IP-address source node receives S34 an acknowledgment of the MPTCP notification from the destination node.

When a multipath TCP connection is established and TCP data is transmitted by means of multiple subflows, proper identification and separation of the multiple subflows to different radio accesses or network paths ensures that clear benefits are gained with from the multipath connection.

The single IP-address source node associates S35 each MPTCP subflow to a respective wireless link, i.e. packets associated with a specific MPTCP subflow are mapped to a corresponding access or network path. Establishment of the MPTCP subflows are mapped to different radio accesses below the TCP/IP-layer. In an exemplary embodiment, MPTCP-subflow-1 is mapped to LTE, MPTCP-subflow-2 is mapped to WCDMA/HSPA and a MPTCP-subflow-3 of the TCP connection is mapped to Wi-Fi.

The association is communicated S36 from the single IP-address source node to the destination node, so that the destination node is capable of associating each MPTCP-subflows to a respective radio access below the IP-layer. In an exemplary embodiment, MPTCP-subflow-1 is mapped to LTE, MPTCP-subflow-2 is mapped to WCDMA/HSPA and MPTCP-subflow-3 is mapped to Wi-Fi.

Information on each association between an MPTCP subflow and a respective wireless link is communicated S36 to the destination node from the single IP-address source node, e.g. by use of a specific Traffic Flow Template, TFT. When using the Traffic Flow Template for providing information on the association between an MPTCP subflow and a respective wireless link the 5-tuple of the TFT is appended with additional information to indicate the radio access to be used in both the single IP-address source node and the destination node, e.g a user equipment, UE, and a gateway node in the wireless network. Consequently, use of a specific TFT implies association of a MPTCP subflow to a respective wireless link. In accordance with another option of the disclosure, the association or mapping is performed in two steps where the TFT is used to communicate an association of a packet to a specific PDP context/Radio Access Bearer/Radio Bearer, while other signaling is used to map the PDP context/Radio Access Bearer/Radio Bearer to a specific radio access.

The Traffic FlowTemplates, TFT, can be installed in a user equipment, UE, being a single IP-address source node or a destination node for the MPTCP connection. According to an option of the disclosure, the TFT are installed in the UE using NAS level signaling for example for PDP context setup or PDN connection establishment. According to a further option, the TFTs are coordinated so that MPTCP subflows hold the same mapping, i.e. association, both in uplink and downlink. When installing the TFTs in a UE, the wireless network need an awareness of the specific source TCP port used for a specific MPTCP subflow.

According to an option of the disclosure, the identification/determination of TFTs is done either by a user equipment, UE, or the network or both. The UE determines through packet sniffing the establishment of new subflows and assigns new TFTs to the new subflows. The same option applies for the network. According to yet an option of the disclosure, the network performs packet inspection and communicates the TFT settings towards the UE and other nodes handling user plane data, e.g. GGSN/SGSN, PDN-GW/S-GW and RNC/eNB/NB. It is also envisioned that the UE only does the packet inspection and sends the TFT to the network which communicates the TFT to the appropriate nodes handling user plane data.

In the previously disclosed options wherein the lower layers upon communicating to the MPTCP layer on the availability of another path also communicates a range of port numbers to be used or when a fixed mapping rule is used, there is no need for packet inspection to determine new subflows as the TFT can be set immediately after the availability of the new path is communicated to the MPTCP layer.

Figure 4:
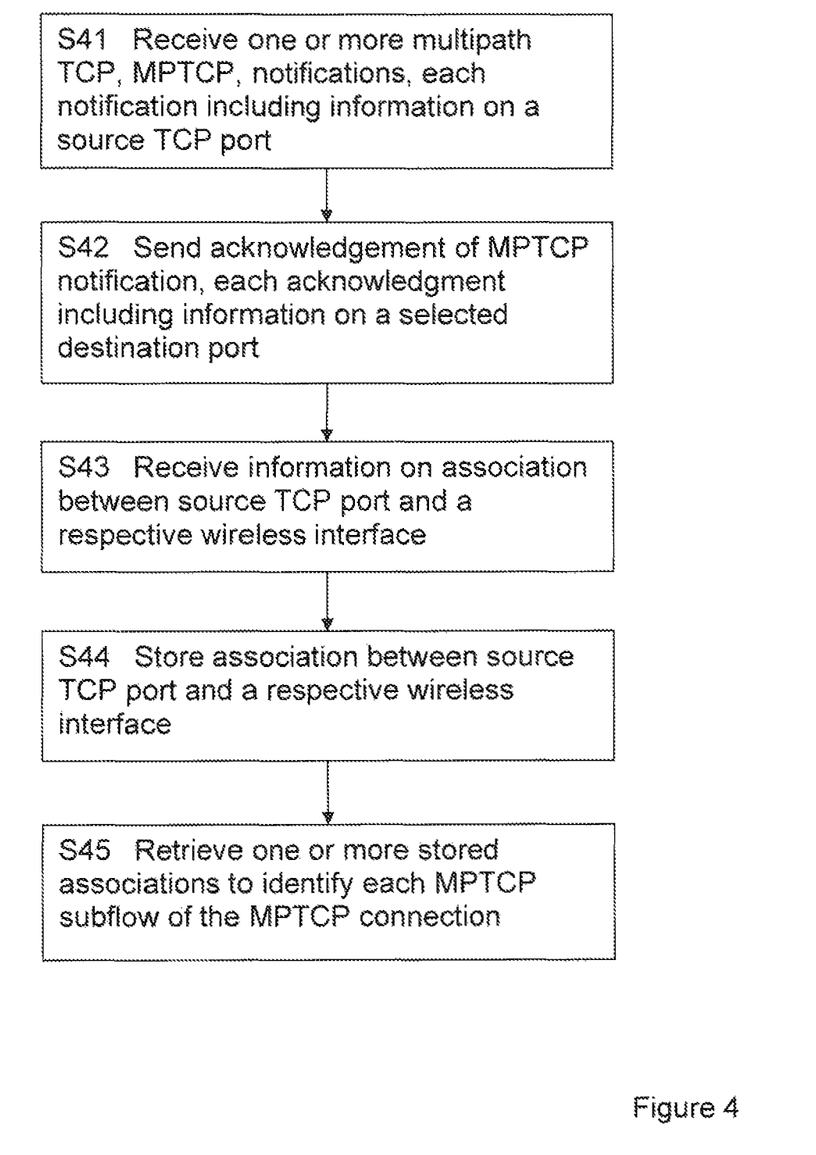
FIG. 4 is a flowchart illustrating embodiments of method steps performed in a destination node

FIG. 4 is a flowchart illustrating embodiments of method steps performed in a destination node in a wireless communication network to establish a multipath TCP connection including a plurality of MPTCP subflows to a destination node. The destination node receives S41 one or more of the multipath TCP, MPTCP, notifications sent from a single IP-address source node, wherein each MPTCP notification includes information on a selected source TCP port. Each source TCP port is selected as previously described in relation to the method in the single IP-address source node. The destination node responds to the single IP-address source node by sending S42 an acknowledgement of each received MPTCP notification. The acknowledgment includes information on a selected destination port of the destination node.

When a multipath TCP connection is established and TCP data is transmitted by means of multiple subflows, proper identification and separation of the multiple subflows to different radio accesses or network paths ensures that clear benefits are gained from the multipath connection.

The destination node, receives S43 information on the association between a source TCP port and a respective wireless link from the single IP-address source node, e.g. as part of signaling during establishment of the MPTCP subflow. The destination node stores S44 the association between the source TCP port and a respective wireless link. The association stored in the destination node is retrieved S45 and used to identify and separate each multipath TCP, MPTCP, subflow of the MPTCP connection, thus enabling separation of TCP data over a plurality of subflows on a single IP-address TCP connection.

Figure 6:
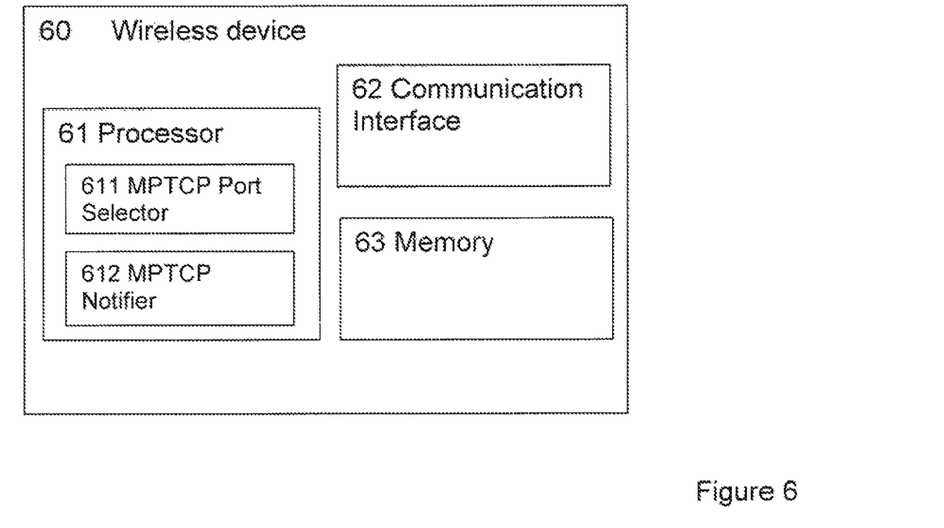
FIG. 6 is a block diagram illustrating a wireless device embodiment

FIG. 6 illustrates a wireless device 60 in a wireless communication network, the wireless device configured for establishing a multipath TCP, MPTCP, connection for receipt of TCP data in MPTCP subflows. The wireless device comprises a communication interface 62 configured to receive an MPTCP trigger to activate a multipath TCP connection and to send one or more MPTCP notifications. The wireless device also includes a processor 61 including a multipath TCP, MPTCP, port selector 611 configured to select one or more source TCP ports. Each source TCP port is selected to constitute a starting point of an MPTCP subflow. The processor 61 further comprises an MPTCP notifier 612 configured to include information on a selected source TCP port in a respective MPTCP notification.

The communication interface 62 and the processor 61 are implemented in hardware or in software or in a combination thereof. The port selector 611 and the MPTCP notifier 612 are according to one aspect implemented as a computer program stored in a memory 63 which is run on the processor 61. The processor 61 is further configured to implement all the aspects of the disclosure as described in relation to the methods.

The invention claimed is:

1. A method, performed in a single internet protocol, IP, address source node in a wireless communication network, of establishing a multipath transmission control protocol, MPTCP, connection for transfer of transmission control protocol, TCP, data in MPTCP subflows to a destination node, the method comprising:
   receiving an MPTCP trigger to activate a multipath TCP connection;
   selecting, at the single IP address node, at least one source TCP port, each source TCP port selected to constitute a starting point of an MPTCP subflow;
   sending at least one MPTCP notification to the destination node, each MPTCP notification including information on a selected source TCP port; and
   receiving an acknowledgment of each MPTCP notification from the destination node.

2. The method according to claim 1, further comprising: associating each MPTCP subflow to a respective wireless link.

3. The method according to claim 1, wherein activation of the multipath TCP connection comprises initiating at least one further subflow for an established TCP connection.

4. The method according to claim 3, wherein the MPTCP trigger is received in a three way TCP handshake establishing a first connection between the single IP-address source node and the destination node.

5. The method according to claim 2, further comprising communicating information on each association by means of a respective Traffic Flow Template, TFT.

6. The method according to claim 1, wherein the MPTCP trigger is received in a message on a radio access protocol layer from a network entity.

7. The method according to claim 4, wherein the MPTCP trigger is received in one of a Radio Resource Control, RRC, Packet Data Convergence Protocol, PDCP, Radio Link Control, RLC, and Medium Access Control, MAC, protocol layer message.

8. The method according to claim 1, further comprising:
   providing an indication on the received MPTCP trigger to an MPTCP entity in the single IP-address source node configured to at least one of add and remove MPTCP subflows.

9. The method according to claim 7, wherein the indication to the MPTCP entity is provided in MPTCP signaling.

10. The method according to claim 6, wherein the indication to the MPTCP entity is provided in a protocol extension of MPTCP signaling.

11. The method according to claim 1, wherein a MPTCP subflow is established over a $3^{rd}$ Generation Partnership Project, 3GPP, Radio Access Technology, RAT, wireless link.

12. The method according to claim 1, wherein a MPTCP subflow is established over one of a LTE and WCDMA/HSPA wireless link.

13. The method according to claim 1, wherein a MPTCP subflow is established over a Wireless Local Area Network, WLAN, wireless link.

14. The method according to claim 1, wherein the destination node is a MPTCP enabled server.

15. The method according to claim 1, wherein the destination node is a MPTCP proxy.

16. A method in a destination node of a wireless communication system of establishing a multipath transmission control protocol, MPTCP, connection for receipt of transmission control protocol, TCP, data in MPTCP subflows from a single internet protocol, IP, address source node, the method comprising:
   receiving at least one multipath TCP, MPTCP, notification from the single IP-address source node, each MPTCP notification including information on a selected source TCP port;
   sending an acknowledgement of each received MPTCP notification to the single IP-address source node, the acknowledgement including information on a selected destination port;
   receiving information on association between a source TCP port and a respective wireless link;
   storing the association between source TCP port and a respective wireless link; and
   retrieving at least one stored association to identify and separate each MPTCP subflow of the MPTCP connection.

17. A single internet protocol, IP, address wireless device in a wireless communication network, the wireless device configured for establishing a multipath transmission control protocol, MPTCP, connection for transfer of transmission control protocol, TCP, data in MPTCP subflows, the single IP-address wireless device comprising:
   a communication interface configured to receive, at the single IP-address wireless device, an MPTCP trigger to activate a multipath TCP connection and to send at least one MPTCP notification; and
   a processor including a multipath TCP, MPTCP, port selector configured to select, at the single IP-address wireless device, at least one source TCP port, each source TCP port selected to constitute a starting point of an MPTCP subflow; and an MPTCP notifier configured to include information on a selected source TCP port in a respective MPTCP notification.

18. The method according to claim 2, wherein activation of the multipath TCP connection comprises initiating at least one further subflow for an established TCP connection.

19. The method according to claim 18, further comprising:
   providing an indication on the received MPTCP trigger to an MPTCP entity in the single IP-address source node configured to at least one of add and remove MPTCP subflows.

20. The method according to claim 1, wherein the establishing of the MPTCP connection occurs at a protocol layer below an IP protocol layer.

* * * * *